US006249790B1

(12) United States Patent
Babcock, Jr.

(10) Patent No.: US 6,249,790 B1
(45) Date of Patent: Jun. 19, 2001

(54) RELATIONAL DATABASE MANAGEMENT SYSTEM AND METHOD OF OPERATION

(75) Inventor: William Babcock, Jr., Portland, OR (US)

(73) Assignee: Babcock & Jenkins, Inc., Beaverton, OR (US)

( * ) Notice: Subject to any disclaimer, the term of this patent is extended or adjusted under 35 U.S.C. 154(b) by 0 days.

(21) Appl. No.: 09/127,441

(22) Filed: Jul. 31, 1998

(51) Int. Cl.$^{7}$ ..................................................... G06F 17/00

(52) U.S. Cl. ................................ 707/104; 707/6; 707/10; 707/103; 705/10; 705/26

(58) Field of Search ................................. 707/10, 6, 104, 707/103; 705/26, 10; 709/219; 434/236

(56) References Cited

U.S. PATENT DOCUMENTS

| | | | | |
|---|---|---|---|---|
| 4,992,940 | * | 2/1991 | Dworkin | 705/26 |
| 5,761,662 | * | 6/1998 | Dasan | 707/10 |
| 5,967,789 | * | 10/1999 | Segal et al. | 434/236 |
| 5,973,972 | * | 8/1998 | Shane | 709/219 |
| 5,974,396 | * | 10/1999 | Anderson et al. | 705/10 |

OTHER PUBLICATIONS

"Learning from hoteists and coldeists: toward a WWW information filtering and seeking agent" by Michael Pazzani et al., University of alifornia, Irvine, CA, pp. 1–7, Jan. 1995.*

Cèzar Diaz, The Oregonian, Portland Oregon Advertizing Column, pp. 1–2, Oct. 1999.*

"WebProfiler connects to the Web but keeps its people link" by Sara Teasdale, Business Marking (p. 35), pp. 1–2, Jun. 1998.*

Forbes', "Funding Up", Forges, v157, n11, pS22(1), Schumpeter, MO pp. 1–2, Jun. 1996.*

* cited by examiner

*Primary Examiner*—Thomas Black
*Assistant Examiner*—Diane D. Mizrahi
(74) *Attorney, Agent, or Firm*—Kolisch, Hartwell, Dickinson, McCormack & Heuser

(57) ABSTRACT

A method of operating a database of records. The method includes providing an internet web site containing selected information, and providing a computer containing the database. Each record of the database is associated with each of a number of contacts. An identifying code is generated for each contact, and is transmitted to each contact. When a contact attempts to access the website, the contact is asked to input the code. In response to entry of the code, access is provided to a selected portion of the selected information.

19 Claims, 3 Drawing Sheets

| {PIN} | {NAME} | {ADDR} | {TEL} | {DATA 1} | {DATA 2} | ... | {DATA N} |
|---|---|---|---|---|---|---|---|
| 0001 | NAME1 | ADDR1 | TEL1 | ABC | 1 | | 101 |
| 0002 | NAME2 | ADDR2 | TEL2 | XYZ | 2 | | 111 |
| 0003 | NAME3 | ADDR3 | TEL3 | 123 | 3 | | 011 |
| ... | | | | | | | |
| ... | | | | | | | |
| ... | | | | | | | |
| ... | | | | | | | |
| ... | | | | | | | |
| N | NAME N | ADDR N | TEL N | ZZZ | 0 | | 100 |

RELATIONAL DATABASE MANAGEMENT SYSTEM AND METHOD OF OPERATION

FIELD OF THE INVENTION

This invention relates to database systems, and more particularly to internet-based systems for direct marketing contact management and servicing.

BACKGROUND AND SUMMARY OF THE INVENTION

Direct mail and internet web-based marketing techniques have been combined by companies sending advertising correspondence including a web address or URL. This enables interested recipients to visit a web page associated with the company or product, gaining more detailed information, and possibly requesting additional material to be mailed. Such web sites may require that a visitor enter personal address information, either to gain entry, or to enable additional mailings to be sent. Such information may also be used to enable a sales person for the company to contact the recipient.

When personal information is entered, the user's visit to the web site may be recorded, including time spent at different pages, to indicate particular product interests. However, requiring the entry of personal information is undesirable for several reasons. Desired cross checking with existing database records may be difficult due to the different formatting, spelling, and other errors that may lead to duplicate records. Also, requiring the entry of personal information is undesirable to some users who wish to preserve privacy. This may lead some potential customers not to visit the web site, or to enter incorrect address information.

Permitting anonymous use of a web site may lead to more visitors, but does not provide the operator with information about who has visited. Such systems record only the number of "hits" or visits to a web page, but not useful contact information, or interests indicated by use of the web pages. Anonymous systems may indicate what are popular areas of a web site, but not the particular interests or needs of a particular, identifiable user to guide future marketing efforts.

Other traditional marketing systems have additional disadvantages. For instance, a reader response card from a magazine might provide useful feedback to a company or publisher which products or advertisers are of sufficient interest to merit sending detailed product information. However, such procedures involve appreciable delay between mailing of the card, and receipt of the requested information, particularly if the information is bundled for mailing only at intervals.

The embodiment disclosed herein overcomes these disadvantages by providing a method of operating a database of records. The method includes providing an internet web site containing selected information, and providing a computer containing the database. Each record of the database is associated with each of a number of contacts. An identifying code is generated for each contact, and is transmitted to each contact. When a contact attempts to access the website, the contact is asked to input the code. In response to entry of the code, access is provided to a selected portion of the selected information.

BRIEF DESCRIPTION OF THE DRAWINGS

FIG. 2 is a schematic view of a database according to the embodiment of FIG. 1.

DETAILED DESCRIPTION OF A PREFERRED EMBODIMENT

Figure 1:
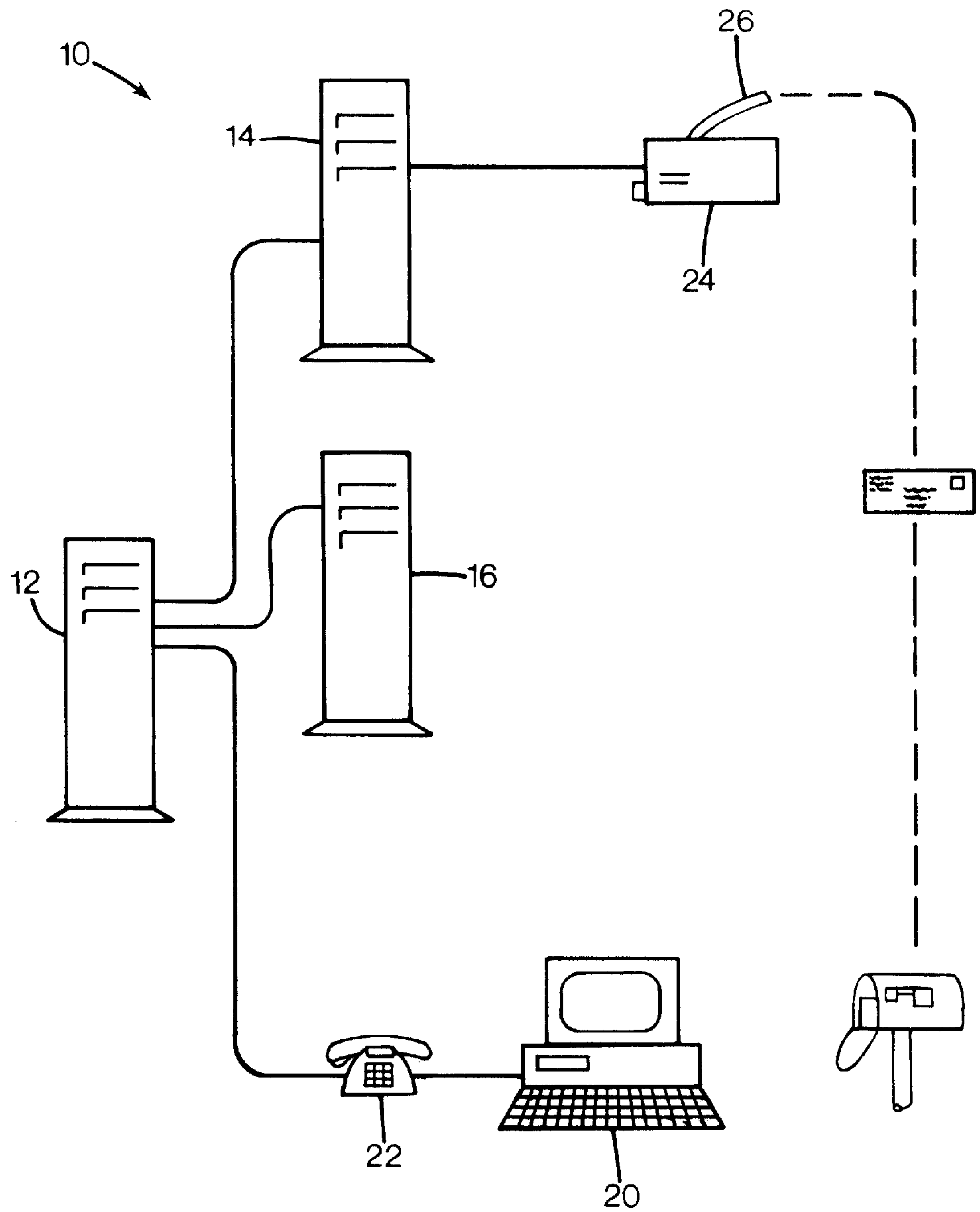
FIG. 1 is a schematic view of a computer system according to a preferred embodiment of the invention.

FIG. 1 shows a computer system 10 including an internet server 12, and first and second company servers 14, 16 connected to the internet server. The internet server is considered symbolically as representing the entirety of the internet, which actually includes a multitude of such interconnected computers at different locations. A customer's computer 20 is also connected to the internet server 12, typically via a telephone connection 22.

The first company server is connected to a printer 24, which imprints information on a written correspondence such as a direct mailing advertising document 26. The first company server 14 has a memory device that contains a database 30 of records 32 as shown in FIG. 2. Each record represents a customer or contact, and includes numerous fields, including name, address, and other contact information, as well as other data fields used for marketing information that may be analyzed to assess that customer's possible purchasing interests and prospects for further marketing efforts. The records may be modified or augmented with additional data as discussed below.

Referring back to FIG. 1, the company server 14 may be replaced by several different computers, any of which may be separately connected to the internet or to each other, and any of which interconnections may be replaced by transferring data on a data storage media such as a magnetic disc. Such data transfer capabilities shall for the purposes of this application be considered a "connection." Although the company server 14 is shown as driving the printer 24, the printer may be a high volume addressing system, using pre-printed advertising media, operated by a separate computer. Also, while the several computers are shown as connected to an internet server 12, the invention may be embodied in any arrangement of computers, data transmission, or telecommunication transmission devices or media.

Figure 3:
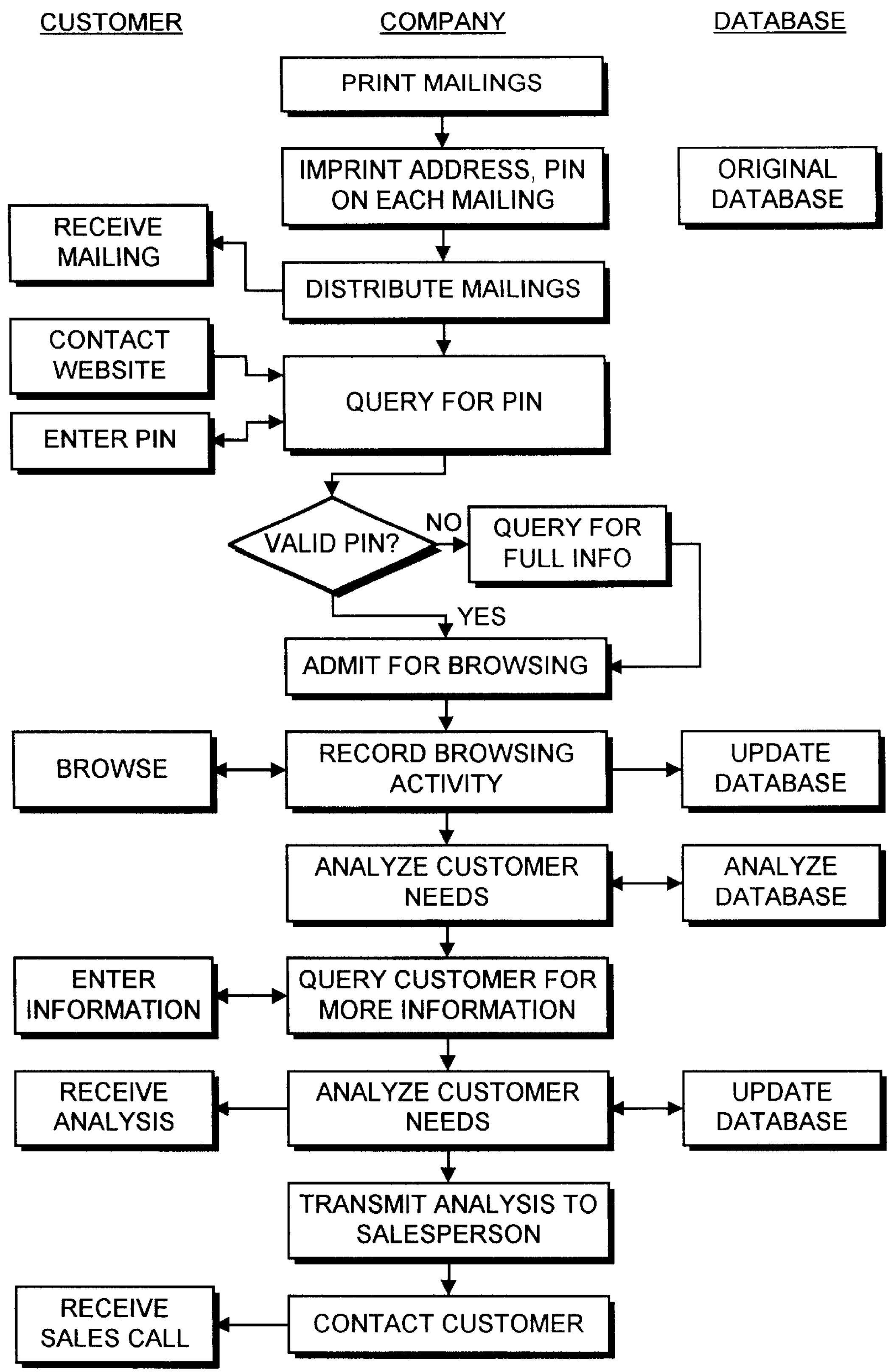
FIG. 3 is a flow chart illustrating a method of operation of the preferred embodiment of the invention.

FIG. 3 illustrates a method of operating the database system, including methods for communication between various parties. Initially, the company has a customer database 30 as shown in FIG. 2, which may include a minimum basic mailing or email address information, along with a unique PIN (personal identification number) code. The PIN may be any string of alphanumeric characters. Preferably, the database is drawn from a source selectively including promising potential customers as the listed contacts. Ideally, the database will have fields indicating the potential product interests of the contacts, such as which types of the company's products are likely to be of greater interest, whether the contact is an individual or corporate purchaser, whether the contact has expressed a prior interest from a reader response card, whether the contact has made prior purchases from the company, among an unlimited range of other possibilities providing a qualitative or quantitative evaluation of the contact as a customer. Just as an expert sales person keeps a written and mental list of the interests and priorities of his or her best customers in order to customize sales discussions to make best use of the customer's time, the database contains all available information to provide focused and useful marketing efforts.

With the database in place, the company prepares a direct mailing or other communication. The mailing is preprinted, with all copies identical, except for a blanks for address information and PIN number on each mailing. The mailing likely includes a range of different products or services, particularly in view of the likelihood that the database includes contacts of uncertain needs. For instance, if the company is marketing high speed laser printers, the database might include print shops, corporate and government document managers, and other entities likely to need such equipment. It may be uncertain what type of product each contact needs, since the print volume and other factors are not in the database. Thus, a wide range of copiers having different print volume capacities might be advertised. The mailing includes an invitation to visit the company's web site, as well as identifying the web address for the site.

To simplify manual entry of the web address for the customer, the company's brief main address or primary domain name may be used. Instead of a long string such as "www.xyzcompany.com/customerinfo/products/printers/laser/highspeed/1000series.htm", the mailing would have a brief web address such as "www.xyzinfo.com".

The contacts to whom the mailing is suited are selected from the database, and their address and PIN numbers printed on the mailings by printer 24, which may be connected to the main server 14, or any other company computer containing the database. Upon receipt, the interested customer would visit the web site by typing the simple web address. This provides access to the initial welcome screen of the company's web page, which prompts the customer to enter the PIN number. When the PIN is entered, the server, which contains the database, searches the database for the record associated with the PIN. If the server finds a match for the PIN, it then identifies the mailing that was sent out with this pin to deter. (Note that a customer receiving more than one different mailing would likely have different PIN numbers for each mailing.)

In the simple case in which all mailing recipients are to be treated the same, a second welcome page associated with the probable interests of the mailing recipients is transmitted. In more sophisticated applications, each PIN and record may be pre-categorized into one of several different possible marketing strategies (e.g. for corporate, government, academic, and individual customers), with the pre-established web page being transmitted after the category is identified based on the PIN number entry. A still more sophisticated analysis may be made at the time of access by the customer, with transmissions to the customer being further customized based on information gleaned based on the time of access, the site or phone number from which access is made, or by other information transmitted or made implicit by the initial contact by the customer. If this information is collected, it is stored to the database to update the customer's record. If a valid PIN number is not entered, a visitor to the web page is invited to register by providing contact information, and a record is added to the illustrated database, or to another database of potential customers.

The second welcome page may include a personalized greeting, and may provide the opportunity to correct or update the customer's information. Such information is sometimes best gathered by providing a pleasant incentive to the customer, such as by offering entry in a contest for a prize, or future discounts. This is because many customers would otherwise prefer not to spend the time or to make personal disclosures. The second welcome page provides the opportunity to access information about other of the company's products, but is designed primarily to focus on the products in which the customer is most likely to be interested.

In a basic form, the customer may then be left to select information and other web pages based on his or her own interests and needs, potentially leading to a request for more mailed information or to a call from or meeting with a sales person. All information about which pages the customer viewed, for how long, and other aspects of the visit may be recorded in the database to provide an improved picture of the customer's interests.

In a more sophisticated form, the server may gather more information about the customer by soliciting additional inputs by the customer. To do this, incentives are preferably provided. For instance, the customer may be presented with the opportunity to have the company's software determine what capacity of printer the customer might require. The web page presents a questionnaire for the customer to input the nature, quantity, and frequency of different types and sizes of copy or printing jobs in his or her operation. Software operating in the server analyzes what types of printers would be suitable, and advises the customer. Further information may be provided to and collected from the customer based on this advice and on the customer's browsing activities. Meanwhile, the database is updated with this very useful information.

After the customer has finished his browsing of the company's web site, the database record is reanalyzed to determine what action is required. Alternative actions may include mailing or emailing of information, or transmission of an advisory message to a sales person connected to the company's second server 16. Preferably, in response to a customer demonstrating substantial interest in a product, an email is automatically generated and sent to the appropriate sales person, as determined by rules stored in the system, with a report based on the customer's updated database record. The sales person may then immediately call the customer to offer more information or to schedule a meeting. The analysis of the customer's record to determine action may simply involve sending information if the customer spent more than a given amount of time actively viewing web pages about given products, or may involve a more complex analysis. For instance, if the customer provided significant new information voluntarily, a sales call may be generated. However, if the customer entered information indicating that he or she was not suited to any of the company's products, further efforts might be avoided, conserving marketing resources.

While the disclosure is made in terms of a preferred embodiment, the invention is not intended to be so limited. For instance, the discussed web servers and database may be maintained and operated by a marketing company separate from the company producing the products or services being marketed. Also, the product examples given are one basic example, while there need be no limitation on the range of products and services covered.

What is clamed is:

1. A database and marketing management system comprising:

a computer having a memory device;

a database stored in the memory device and having a plurality of records, each record including an associated identifying code and a data set associated with a contact the identifying code and data set being categorized into one of several different marketing strategies;

a printer connected to the computer and operable to print the code and at least some of the data set on a correspondence document;

an internet connection operably connecting the computer to a communication system accessible by the contact; and the computer being operable in response to entry of the code by the contact to provide selected information to the contact such selected information corresponding to be categorized marketing strategy;

wherein the computer is operable to collect information from the contact; and wherein the computer is operable to transmit the collected information to a selected third party for use in selectively servicing the contact.

2. The system of claim 1 wherein the computer is operable to modify the record in response to information collected from the contact.

3. The system of claim 1 wherein the computer is operable to evaluate the information collected from the contact.

4. The system of claim 1 wherein the correspondence document includes a web address associated with the computer.

5. The system of claim 1 wherein the collected information includes information gleaned based on the time of access.

6. The system of claim 1 wherein the collected information includes information gleaned based on a site from which access is made.

7. The system of claim 1 wherein the collected information includes information gleaned based on a telephone number from which access is made.

8. The system of claim 1 wherein the collected information includes information gleaned based on predetermined information transmitted by an initial session with the contact.

9. The system of claim 1 wherein the collected information includes information gleaned based on predetermined information made implicit by an initial session with the contact.

10. The system of claim 1 wherein the associated code and the data set are precategorized into one of several different predetermined marketing strategies.

11. The system of claim 1 wherein collecting information from the contact is gathered by providing an incentive to the contact.

12. A method of providing access to an internet web site comprising:

providing a web site containing selected information;

providing a computer containing a database of a plurality of records, each record associated with a contact of a plurality of contacts;

generating an identifying code for each contact, the identifying code being categorized into one of several different marketing strategies;

transmitting the code and a web address associated with the web site to at least one of the contacts;

in response to attempted access of the web site by a contact, querying the contact for the code;

in response to entry of the code, providing access to a selected potion of the selected information in accordance with the marketing strategy associated with the code.

13. The method of claim 12 including modifying the record to include information associated with the contact's access to the web site.

14. The method of claim 13 including querying the contact for additional selected information and modifying the record to include the information.

15. The method of claim 13 including evaluating the contact in response to the information associated with the contact's access.

16. The method of claim 13 including transmitting information to a third party regarding the information associated with the contact's access.

17. The method of claim 12 including printing the code on a correspondence directed to the contact.

18. The method of claim 17 wherein the correspondence includes a web address associated with the web site.

19. A database and marketing management system comprising:

a computer having a memory device;

a database stored in the memory device and having a plurality of records, each record including an associated identifying code and a data set associated with a contact;

a printer connected to the computer and operable to print the code and at least some of the data set on a correspondence document;

an internet connection operably connecting the computer to a communication system accessible by the contact; and the computer being operable in response to entry of the code by the contact to provide selected information to the contact;

wherein the computer is operable to collect information from the contact the collected information including information gleaned based on predetermined information transmitted to the computer during a session with the contact; and wherein the computer is operable to transmit the collected information to a selected third party.

* * * * *